United States Patent

Vasta

[15] 3,673,148

[45] June 27, 1972

[54] ABRASION RESISTANT COATING COMPOSITION OF AN ACRYLIC POLYMER, A POLYESTER AND A THERMOSETTING CONSTITUENT

[72] Inventor: Joseph A. Vasta, Woodbury, N.J.

[73] Assignee: E. I. du Pont de Nemours and Company, Wilmington, Del.

[22] Filed: May 20, 1971

[21] Appl. No.: 145,535

[52] U.S. Cl. ..................260/39 R, 260/850, 260/851, 260/862
[51] Int. Cl. ..................................................C08g 51/04
[58] Field of Search ......................260/850, 851, 862, 39

[56] References Cited

UNITED STATES PATENTS

| 2,681,897 | 6/1954 | Frazier et al. | 260/45.2 |
| 3,366,706 | 1/1968 | Vasta | 260/834 |
| 3,375,227 | 3/1968 | Hicks | 260/47 |
| 3,376,271 | 4/1968 | Masters et al. | 260/78.4 |
| 3,600,459 | 8/1971 | Vasta | 260/834 |
| 3,622,651 | 11/1971 | Vasta | 260/856 |
| 3,558,564 | 1/1971 | Vasta | 260/77.5 |
| 3,382,294 | 5/1968 | Christenson et al. | 260/873 X |

Primary Examiner—Morris Liebman
Assistant Examiner—S. M. Person
Attorney—Hilmar L. Fricke

[57] ABSTRACT

A coating composition that forms a high quality abrasion resistant finish for fiberglass reinforced plastic sinks and bathtubs contains as the binder 1. an acrylic graft copolymer having attached to its backbone side chain ester units containing reactive hydroxyl groups;

II. a polyester of two or more dicarboxylic acids or anhydrides, a glycidyl ester, a glycol and a triol;

III. an alkylolated medium formaldehyde resin; and contains pigments in a pigment to binder ratio of 50:100 to 250:100 of a blend of a primer pigment such as titanium dioxide and an abrasive pigment of zirconium silicate.

11 Claims, No Drawings

ABRASION RESISTANT COATING COMPOSITION OF AN ACRYLIC POLYMER, A POLYESTER AND A THERMOSETTING CONSTITUENT

BACKGROUND OF THE INVENTION

This invention relates to a coating composition for reinforced plastic sheet materials and in particular to a coating composition that forms a high quality abrasion resistant finish on fiberglass reinforced plastic sinks vending bathtubs. 30, 1968; al., Thermosetting coating compositions are well known in the art and have been widely used for autos, appliances, such as refrigerators, stoves, washers and dryers, air conditioners and the like and also for vending machines. Typical thermosetting coating compositions are shown in Frazier et al., U.S. Pat. No. 2,681,897, issued June 22, 1954; Vasta, U.S. Pat. No. 3,366,706, issued Jan. 30, 1968; Hicks, U.S. Pat. No. 3,375,227, issued Mar. 26, 1968; Masters et al., U.S. Pat. No. 3,376,271, issued Apr. 2, 1968; Vasta, U.S. Pat. No. 3,622,651 and Vasta, U.S. Pat. No. 3,600,459. However, these compositions do not provide the degree of adhesion to a reinforced plastic substrate or the abrasion resistance required for finishes of bathtubs and sinks.

The novel coating composition of this invention forms a hard highly durable abrasion resistant, stain resistant finish for sinks and bathtubs formed from reinforced plastic materials.

SUMMARY OF THE INVENTION

The coating composition of this invention comprises 10–70 percent by weight of a film forming binder in an organic solvent; wherein the filming forming binder consists essentially I 20–70 percent by weight of a graft copolymer having a backbone of polymerized monomers which are either an aromatic hydrocarbon monomer having vinylene groups, an alkyl acrylate, and alkyl methacrylate, acrylonitrile, methacrylonitrile and mixtures thereof wherein the alkyl groups have one to eight carbon atoms and has ester groups attached directly to its backbone; these ester groups comprise about 10–75 percent of the total weight of the polymer and consist essentially of Ester Group (A)

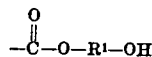

and Ester Group (B), which is either

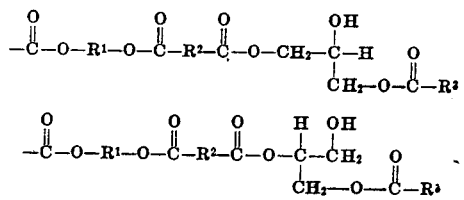

or a mixture of these groups;
wherein the molar ratio of Ester Group (A) to Ester group (B) is from about 1:1.5 to 1:2.5; and wherein $R^1$ is a saturated hydrocarbon radical having two to 10 carbon atoms, $R^2$ is selected from the group consisting of alkylene, vinylene, aromatic, carbocylic and heterocyclic radicals, and $R^3$ is selected from the group consisting of a saturated aliphatic hydrocarbon radical having one to 26 carbon atoms and an ethylenically unsaturated aliphatic hydrocarbon radical having 12 to 18 carbon atoms.

II. 5–40 percent by weight of a polyester that consists essentially of
1. maleic anhydride and one or more dicarboxylic acids selected from the group consisting of fumaric, itaconic, ortho-phthalic and isophthalic acids;
2. a glycidyl ester of the formula

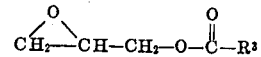

in which $R^3$ is defined above;
3. ethylene glycol, propylene glycol, 1,3-butane diol, 1,4-butane diol or neopentyl glycol; and
4. trimethylol ethane, trimethylol propane, glycerine or pentaerythritol.

III. 15–55 percent by weight of a melamine/formaldehyde resin that has at least been partially reacted with a monohydric alcohol having one to four carbon atoms; and containing pigments in a pigment to binder ratio of 50:100 to 250:100, wherein the pigments comprise a primer pigment and an abrasive pigment in a weight ratio of primer pigment to abrasive pigment of about 2:1 to about 1:5.

DESCRIPTION OF THE INVENTION

Preferably, the novel coating composition of this invention has a binder content of 40–60 percent by weight and the binder comprises 40–50 percent by weight of the graft copolymer, 20–30 percent by weight of the polyester and 20–40 percent by weight of the melamine/formaldehyde resin. Also, the preferred composition contains titanium dioxide as the primer pigment and zirconium silicate as the abrasive pigment.

The graft copolymer used in the novel process of this invention utilizes ethylenically unsaturated monomers for the backbone. Typical monomers that can be used for the backbone are, for example, aromatic hydrocarbons having vinylene groups, such as styrene, alkyl substituted styrene, such as α-methyl styrene; vinyl toluene; acrylonitrile methacrylonitrile; esters of methacrylic acid and acrylic acid, preferably acrylic esters having one to eight carbon atoms in the alkyl group, such as methyl methacrylate, ethyl methacrylate, propyl methacrylate, butyl methacrylate, hexyl methacrylate, 2-ethylhexyl methacrylate, and the like, methyl acrylate, ethyl acrylate, propyl acrylate, butyl acrylate, hexyl acrylate, 2-ethylhexylacrylate and the like or mixtures of these monomers. Small amounts of ethylenically unsaturated carboxylic acids can also be used in the backbone, such as acrylic acid, methacrylic acid, crotonic acid, itaconic acid, maleic acid and the like.

Particularly useful monomers or combinations of monomers which form the backbone of high quality polymers of this invention are, for example, styrene, methyl methacrylate, butyl methacrylate, ethyl acrylate, acrylonitrile and methacrylonitrile.

Ester Group (A) of the graft copolymer used in this invention is provided by a hydroxyalkyl substituted vinyl addition monomer, such as hydroxyalkyl methacrylate, a hydroxyalkyl acrylate, a hydroxyalkyl maleate, hydroxyalkyl itaconate, or a mixture of these in which the alkyl group contains two to 10 carbon atoms. The hydroxyalkyl monomer is polymerized with the aforementioned backbone monomers.

Preferred hydroxyalkyl monomers used for forming the graft copolymer of this invention are, for example, hydroxyethyl methacrylate, hydroxypropyl methacrylate, hydroxybutyl methacrylate, hydroxyoctyl methacrylate, hydroxyethyl acrylate, hydroxypropyl acrylate, hydroxybutyl acrylate, hydroxyoctyl acrylate and the like. Preferred are hydroxyalkyl methacrylates or acrylates in which the alkyl groups contain two to four carbon atoms.

Ester Group (B) is the esterification product of the aforementioned hydroxyalkyl monomers, an anhydride of a dicarboxylic acid and a glycidyl ester. This ester group is polymerized into the polymer backbone through the ethylenic unsaturation of the aforementioned hydroxyalkyl monomers.

The anhydride used for forming Ester Group (B) has the formula

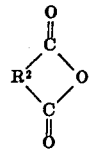

wherein R² is either alkylene, vinylene, aromatic, carbocyclic or a heterocyclic radical. The anhydride reacts with the hydroxyalkyl monomer and also reacts with the glycidyl ester to form Group (B).

Anhydrides useful in this invention in which R² is an alkylene group are formed from dicarboxylic acids of the general formula $(CH_2)_n(COOH)_2$ where $n$ is forom 2–10. Typical dicarboxylic acids of this group are glutaric, adipic, pimelic, succinic acids and the like. The preferred is an anhydride of succinic acid.

Useful anhydrides in which R² is a vinylene group are derived from dicarboxylic acids of the general formula

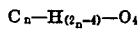

wherein $n$ is from 4–10. Typical dicarboxylic acids of this group are maleic and itaconic acids.

Another group of useful anhydrides are derived from dibasic aromatic acids, such as phthalic acid, uvitic acid and cumidic acid. Often it is desirable to use a halogen substituted anhydride of one of the above aromatic dicarboxylic acids, such as tetrabromo phthalic anhydride. Halogen substituted anhydrides in which the halogen substitutent is either chlorine, bromine or fluorine are particularly useful in forming fire retardant coating compositions.

Anhydrides in which R² is a carbocyclic radical are useful, such as hexahydrophthalic anhydride, which has the following formula

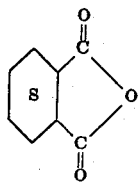

or tetrahydrophthalic anhydride which has the following formula

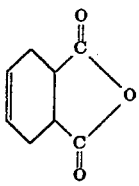

Anhydrides in which R² is a heterocyclic radical are also useful. One particularly useful compound has the general formula:

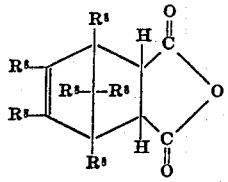

wherein R⁸ is either chlorine, bromine or fluorine. The preferred compound is chlorendic anhydride in which R⁸ is chlorine.

The glycidyl ester used for forming Ester Group (B) has the formula

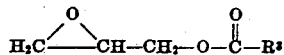

where R³ is a saturated aliphatic hydrocarbon group containing one–26 carbon atoms, or R³ is an ethylenically unsaturated aliphatic hydrocarbon radical of 12–18 carbon atoms derived from a drying oil fatty acid.

Preferred for use because of the quality of the graft copolymer obtained are esters where R³ is a tertiary saturated aliphatic hydrocarbon group of the structure

where R⁴ is -CH₃ and R⁵ and R⁶ are alkyl groups of one to 12 carbon atoms.

One particularly preferred glycidyl ester of this group because it imparts acid and alkali resistance to the final product is a mixed glycidyl ester described in U.S. Pat. No. 3,275,583, issued Sept. 27, 1966, and is manufactured and sold by the Shell Chemical Company as "Cardura" E ester. This glycidyl ester is of a synthetic tertiary carboxylic acid and has the general formula

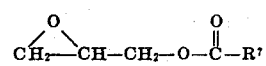

where R⁷ is a tertiary aliphatic hydrocarbon group of eight through 10 carbon atoms.

When R³ of the graft copolymer is an ethylenically unsaturated aliphatic hydrocarbon radical of 12–18 carbon atoms, the glycidyl ester is obtained by esterifying the acid chloride of one of the well known drying oil fatty acids, such as oleic acid, linoleic acid, linolenic acid, oleostearic acid and ricinoleic acid with glycidol. These acids are commonly found in tung oil, linseed oil, dehydrated castor oil and soya oil.

The preferred method for forming the above unsaturated glycidyl esters is to react the sodium salt of the fatty acid with epichlorohydrin. The reaction is as follows:

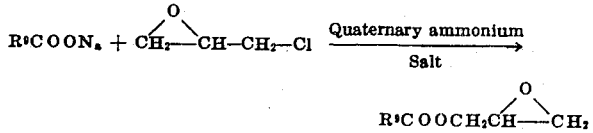

where R⁹ is from one of the aforementioned drying oil fatty acids.

Preferably, the graft copolymer used in this invention has 30 to 60 percent of its total weight contributed by Ester Group (A) and (B). Also, these groups are present in the graft copolymer at a molar ratio of Ester Group (A) to Ester Group (B) of about 1:1.5 to about 1:2.5, and preferably, in a ratio of about 1:2.

One method for preparing the graft copolymer used in this invention is to first form Ester Group (B) by reacting in about an equal molar ratio the above hydroxyalkyl monomers, the anhydride and the glycidyl ester. This esterification product is then reacted with the backbone monomers and the hydroxyalkyl monomers, which form Ester Group (A), to form the novel polymer of this invention.

As a typical example, a hydroxyalkyl acrylate, aromatic anhydride and a glycidyl ester are charged into a reaction vessel with a suitable solvent, such as toluene, xylene, acetone or an aromatic solvent and the mixture is heated to its reflux temperature, which is about 80° to 200° C., for about 30 minutes to 3 hours. The backbone constituents of the graft copolymer, such as styrene/methyl methacrylate and a hydroxyalkyl acrylate with a suitable polymerization catalyst, such as tertiary butyl peroxide, are then slowly added over a 1–4 hour period. The reaction mixture is heated to its reflux temperature which is about 80° to 200° C. for about 30 minutes to 5 hours, preferably 2–4 hours until a graft copolymer is formed that has the desired molecular weight, which is determined by the relative viscosity as described below. Additional solvent may then be added to dilute the polymer solution.

If the reaction rates of the monomer components used to form the graft copolymer used in this invention are suitable, all of the monomers can be charged into a reaction vessel with a suitable solvent and polymerization catalyst and heated to the reflux temperature which is about 80° to 200° C. for 60 minutes to 5 hours.

Another method of preparing the graft copolymer used in this invention is to charge the anhydride, for example, phthalic anhydride, into a reaction vessel with a suitable solvent and heat the mixture for about 30 minutes to effect solution of the anhydride. The other monomer constituents with a suitable polymerization catalyst are then slowly added over a 1-4 hour period into the reaction vessel while maintaining a reflux temperature which is about 80°-200° C. After the above ingredients have been added, the reaction mixture is maintained at its reflux temperature for an additional 30 minutes to about 5 hours.

Suitable solvents which are used to prepare the graft copolymer used in this invention are toluene, xylene, butyl acetate, acetone, methylisobutyl ketone, methylethyl ketone, and other aliphatic cycloaliphatic and aromatic hydrocarbons, esters, ethers, ketones and other solvents which are nonreactive with the monomers used to form the graft copolymer such as are conventionally used in coating compositions.

Suitable polymerization catalysts that are used in the process to prepare the graft copolymer are tertiary butyl peroxide, cumene hydroperoxide, azobisisobutyronitrile and the like. To prepare the Ester Group (B) esterification catalysts, such as quarternary bases or salts as benzyltrimethylammonium hydroxide, benzyltrimethylammonium chloride, octadecyltrimethylammonium chloride, or an amine, such as triethylamine, can be used.

The graft copolymer preferably has a relative viscosity of 0.9 to 1.4. The "relative viscosity" is the value obtained by dividing the efflux time of a solution of the polymer by the efflux time of the solvent used to form the above polymer solution. The efflux times are measured according to the procedure of ASTM-D-445-46-T, Method B, using as the polymer solution 0.25 grams of the polymer in 50 cubic centimeters of ethylene dichloride as the solvent. The efflux times are measured at 25° C. in a standard apparatus, sold under the designation of a modified Ostwald Viscometer.

The polymer solution resulting from the aforementioned process is suitable for direct use in the preparation of the novel coating compositions.

The polyester used in the novel coating composition of this invention preferably is the esterification product of:

1. about 4-15 percent, by equivalents, maleic anhydride and about 30-41 percent, by equivalents, of one or more dicarboxylic acids selected from fumaric, itaconic, orthophthalic and isophthalic acids;

2. about 9-25 percent, by equivalents, of the glycidyl ester component;

3. about 5-27 percent, by equivalents, of the glycol component; and 4. about 23-28 percent, by equivalents, of the triol component.

The percent equivalents, based on 100 weight-equivalents of the reactants used in forming the polyester compositions, is understood to define weight equivalent as the weight of a substance equivalent to 1 gram-atom of hydrogen, 0.5 gram-atom of oxygen, or 1 gram-ion of hydroxyl ion.

Maleic anhydride is mixed with one or more dicarboxylic acids, such as itaconic, fumaric, ortho-phthalic or iso-phthalic acids, to form the anhydride constituent constituent of the polyester compositions of this invention. The inclusion of maleic anhydride in the polyester compositions improves the solubility of the parent polyester compositions in the solvents used in formulating coating compositions.

The glycidyl ester constituent of the polyester is identical to the glycidyl ester described previously.

Typically suitable glycols used to prepare the polyester include ethylene glycol, propylene glycol, 1,3-butane diol, 1,4-butane diol, neopentyl glycol and their equivalents. The inclusion of ethylene glycol in the polyester composition is particularly preferred because of the increased stain resistance imparted to the finished coating composition.

Suitable triol components of the polyester include trimethylol ethane, trimethylol propane and glycerine. Pentaerythritol preferably is used in combination with a mole to mole blend of a glycol. Trimethylol propane is preferably used in the polyester compositions because it improves the aromatic solubility of the resin without adversely affecting the quality of the thermosetting coating compositions.

To formulate a high quality coating composition, the ratio of glycidyl ester to glycol in the polyester composition should be carefully controlled. Control of the glycidyl ester to glycol ratio also prevents premature gelation and aids in achieving the desired cure and hardness of the finished coating composition.

Preferably the ratio of glycidyl ester to glycol, expressed in weight equivalents of ester to weight equivalents of glycol, is about 0.25/1.00-2.25/1.00. For example, in a polyester formulation having 25.6 equivalents trimethylol propane, 7.4 equivalents maleic anhydride, and 37.0 equivalents orthophthalic anhydride, 16.7 equivalents of glycidyl ester and 13.3 equivalents of e.g. glycol, e.g., corresponding to a ratio of 1.25/1.00, are satisfactory amounts to achieve a resin formulation having the requisite properties. Likewise, a suitable polyester formulation results, for example, if 12.8 equivalents of glycidyl ester and 17.2 equivalents of glycol, e.g., corresponding to a ratio of approximately 0.75/1.00 are used.

The thermosetting resin used in the novel coating composition of this invention is a melamine/formaldehyde resin that has been at least partially reacted with a monohydric alcohol having one to four carbon atoms. These resins are prepared by conventional techniques in which a lower alkyl alcohol, such as methanol, butanol, isobutanol, propanol, isopropanol, ethanol and the like, is reacted with the melamine/formaldehyde resin to provide pendent alkoxy groups. One preferred resin is a melamine/formaldehyde resin having three to five of the —$CH_2OH$ groups reacted with methanol. Another thermosetting resin that can be used in this invention is hexamethoxymethylol melamine which is sold under the trade name "Cymel" 300 and 301. Generally, an acid catalyst is used to cure the novel coating composition of this invention formulated with hexamethoxymethylol melamine. Typical strong acid catalysts are sulfuric acid, sulfonic acid, p-toluene sulfonic acid, naphthalene sulfonic acid, hydrochloric acid, phosphoric acid, oxalic acid, citric acid and mixtures thereof.

To provide the novel coating composition with abrasion resistance and to improve the adhesion to plastic fiberglass reinforced substrates, a blend of a primer pigment and an abrasive pigment is used. Typical primer pigments that can be used are titanium dioxide, zinc oxide, barytes and the like. Typical abrasive pigments are zirconium silicate, mill flake powdered glass, sand flour and the like. Preferred is a blend of titanium dioxide and zirconium silicate in a weight ratio of about 1:2 which provides a coating composition with outstanding abrasion resistance and adhesion to the plastic reinforced substrate.

Small amounts of other conventional pigments, dyes and lakes can be added such as carbon black, iron blue, burnt sienna, cadmium red, monastral blue, cobalt blue, phthalocyanine blue, irgazin yellow, molybdate orange, monastral green and the like.

Metallic flakes such as aluminum flake can also be added to the novel composition to provide glamour, alone or in combination with the metal flake. Preferably, about 5-20 percent by weight based on the weight of the binder of cellulose acetate butyrate having a viscosity of 1 second or above is used in the novel composition with metallic flake pigments.

The pigments are introduced into the coating composition by first forming a mill base by conventional sand-grinding or ball-milling techniques, and then blending the mill base with the film-forming resins as shown in the following examples. If cellulose acetate butyrate is used, the mill base is formed on a roll mill with cellulose acetate butyrate and then blended with the film forming resins.

The resins are prepared in solution and then blended with a mill base to form the novel coating composition. Any of the aforementioned solvents can be used to prepare the novel coating composition or to dilute the composition to a desired application viscosity. The novel coating composition is applied by any of the conventional application methods such as spraying, electrostatic spraying, dipping, brushing, roller coating, flow coating and the like. The coating is then baked at about 100–200° C. for about 5 minutes to 2 hours to form a film about 0.5–10 mils thick. The resulting finish has excellent abrasion resistance, excellent adhesion to the substrate, food and drug stain resistance and ultraviolet light resistance.

The novel coating compositions of this invention can be applied to a variety of substrates, for example, metal, wood, glass, and plastics. In particular, the novel coating composition forms excellent finishes on fiberglass reinforced plastic substrates. These substrates are formed into bathtubs, sinks, shower stall floors and the like and are coated with 3–6 mils of the dried and coalesced novel coating composition of this invention. One typical fiberglass reinforced plastic substrate has a matrix of a mixed ester of glycol phthalate and glycol maleate cross linked with styrene.

Another aspect of this invention is a clear paper coating composition of the above graft copolymer and polyester but a urea/formaldehyde resin is used as the cross linking agent. The amounts of the constituents and solvents are about the same as those used above. This composition is applied over a paper substrate and baked for about 0.5–2 minutes at about 125°–175° C. Films of about 0.1–1 mil are applied. The resulting finish is flexible, clear and glossy and is resistant to solvents.

The following examples illustrate the invention. All quantities are on a weight basis unless otherwise indicated.

EXAMPLE 1

A mill base is prepared as follows:

|  | Parts By Weight |
|---|---|
| Titanium Dioxide Pigment (Rutile) | 200 |
| Zirconium Silicate Pigment | 400 |
| Acrylic Resin Solution (55% polymer solids in xylene and cellosolve acetate in which the polymer is 29.5% styrene, 15.0% methyl methacrylate, 16.5% hydroxyethyl acrylate, 14.0% phthalic anhydride and 25.0% "Cardura E" ester, prepared according to Example 1 of Vasta U.S. 3,622,651 | 200 |
| Diacetone Alcohol | 200 |
| Total | 1000 |

The above ingredients are blended together and charged into a conventional sand mill and ground to 0.5 mil fineness.

A coating composition is prepared by blending the following ingredients:

|  | Parts By Weight |
|---|---|
| Mill base (prepared above) | 250.0 |
| Acrylic Resin Solution (described above) | 40.0 |
| Polyester Solution (60% polymer solids in xylene in which the polymer is of 189 parts of "Cardura E" ester*, 49 parts ethylene glycol, 107 parts trimethylol propane, 33 parts maleic anhydride and 225 parts of orthophthalic anhydride prepared according to Example 1 of U.S. 3,600,459 | 41.5 |
| "Uformite" MM83 Solution (80% solids in methanol of a partially methylated melamine formaldehyde resin) | 37.5 |
| Aromatic Naphtha Solvent Boiling Point 165°C. | 16.0 |
| Total | 385.0 |

[*"Cardura" E ester - (a mixed ester described in U.S.P. 3,275,583, issued September 27, 1966, and is a glycidyl ester of a synthetic tertiary carboxylic acid of the formula

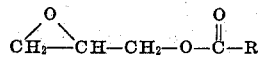

where R is a tertiary aliphatic hydrocarbon group of 8-10 carbon atoms)].

The above ingredients are thoroughly blended together. The resulting coating composition has the following physical properties:

| Total Solids | 65% |
|---|---|
| Pigment to Binder Ratio | 150:100 |
| Binder |  |
|     Acrylic Resin | 45% |
|     Polyester Resin | 25% |
|     "Uformite" Resin | 30% |
| Viscosity – 4 sec. measured in a No. 10 Parlin Cup at 25°C. |  |

The above coating composition is diluted to a spray viscosity of 30 sec. measured in a No. 2 Zahn cup and a finish is then sprayed on to a fiberglass reinforced plastic sheet. The fiberglass reinforced plastic sheet contains a resin matrix of glycol phthalate/glycol maleate ester cross linked with polymerized styrene monomers and contains a fiberglass reinforcing filler, calcium carbonate and titanium dioxide pigments. The solvent is allowed to flash from the finish for about 15 minutes and then the finish is baked for 45 minutes at 125°. The resulting finish is about 3–5 mils thick.

The finish has excellent adhesion to the fiberglass reinforced substrate, excellent abrasion resistance, good resistance to staining by foods and drugs and excellent resistance to ultraviolet light degradation.

EXAMPLE 2

A coating composition is prepared by blending the following ingredients:

|  | Parts By Weight |
|---|---|
| Acrylic Resin Solution (described in Example 1) | 45 |
| Polyester Solution (described in Example 1) | 42 |
| Urea/formaldehyde Solution (60% solids in butanol) | 84 |
| Total | 171 |

The above ingredients are thoroughly blended together. The above composition is then diluted to a 30 percent solids content by the addition of a solvent of a 50:50 mixture of toluene/isopropanol. About 5 parts by weight of a 20 percent solution of paratoluene sulfonic acid are then added and blended with the composition.

The resulting composition is applied to a paper and baked for 30 seconds at 150° C. to form a 0.2–0.5 mil thick coating. The coating is glossy, flexible and withstands 20–30 rubs with a cloth soaked with methyl ethyl ketone.

What is claimed is:

1. A coating composition comprising 10–70 percent by weight of a film forming binder in an organic solvent; wherein the film forming binder consists essentially of I. 20–70 percent by weight of a graft copolymer having a backbone of polymerized monomers selected from the group consisting of polymerized monomers of an aromatic hydrocarbon having vinylene groups, an alkyl acrylate, an alkyl methacrylate, acrylonitrile, methacrylonitrile and mixtures thereof wherein the alkyl groups have one–8 carbon atoms and having ester groups attached directly to its backbone, said ester groups comprising about 10 to 75 percent of the total weight of the polymer and consisting essentially of Ester Group (A)

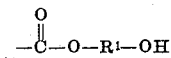

and Ester Group (B) selected from the group consisting of $$-\overset{O}{\overset{\|}{C}}-O-R^1-O-\overset{O}{\overset{\|}{C}}-R^2-\overset{O}{\overset{\|}{C}}-O-CH_2-\overset{OH}{\underset{|}{C}}-H$$
$$\underset{CH_2-O-\overset{O}{\overset{\|}{C}}-R^3}{}$$

$$-\overset{O}{\overset{\|}{C}}-O-R^1-O-\overset{O}{\overset{\|}{C}}-R^2-\overset{O}{\overset{\|}{C}}-O-\overset{H}{\underset{|}{C}}-\overset{OH}{\underset{|}{CH_2}}$$
$$\underset{CH_2-O-\overset{O}{\overset{\|}{C}}-R^3}{}$$

or mixtures thereof, wherein the molar ratio of Ester Group (A) to Ester Group (B) is from about 1:1.5 to 1:2.5; and wherein R$^1$ is a saturated hydrocarbon radical containing two–10 carbon atoms;

R$^2$ is selected from the group consisting of alkylene, vinylene, aromatic, carbocylic and heteroradicals, and R$^3$ is selected from the group consisting of a saturated aliphatic hydrocarbon radical having one to 26 carbon atoms and an ethylenically unsaturated aliphatic hydrocarbon radical having 12 to 18 carbon atoms;

II. 5–40 percent by weight of a polyester consisting essentially of (1) a mixture of maleic anhydride and at least one dicarboxylic acid selected from the group consisting of fumaric acid, itaconic acid, ortho-phthalic acid an isophthalic acid; (2) a glycidyl ester having the formula $$\overset{O}{\overset{/\backslash}{CH_2-CH}}-CH_2-O-\overset{O}{\overset{\|}{C}}-R^3$$

wherein R$^3$ is defined above; (3) a glycol selected from the group consisting of ethylene glycol, propylene glycol, 1,3-butane diol, 1,4-butane diol and neopentyl glycol; and (4) a triol selected from the group consisting of trimethylol ethane, trimethylol propane, glycerine and pentaerythritol; and III. 15–55 percent by weight of a melamine/formaldehyde resin that has at least been partially reacted with a monohydric alcohol having one to four carbon atoms; and containing pigments in a pigment to binder ratio of 50:100 to 250:100 wherein the pigments comprise a primer pigment and an abrasive pigment in a weight ratio of primer pigment to abrasive pigment of about 2:1 to about 1:5.

2. The coating composition of claim 1 having a binder content of 40–60 percent by weight and wherein the binder consists essentially of 40–50 percent by weight of the graft copolymer, 20–30 percent by weight of the polyester and 20–40 percent by weight of the melamine/formaldehyde resin.

3. The coating composition of claim 2 wherein the graft copolymer has a backbone consisting essentially of styrene and an acrylic ester selected from the group consisting of an alkyl methacrylate, an alkyl acrylate and mixture thereof in which the alkyl group contains one to eight carbon atoms; in which R$^1$ is a saturated hydrocarbon group having two to four carbon atoms, R$^2$ is an aromatic radical, and R$^3$ is a tertiary hydrocarbon group having eight through 10 carbon atoms.

4. The coating composition of claim 3 wherein the polyester consists essentially of 1. about 4–15 percent, by equivalents, maleic anhydride and about 30–41 percent, by equivalents, of a dicarboxylic acid selected from the group consisting of fumaric acid, itaconic acid, ortho-phthalic acid and isophthalic acid;

2. about 9–25 percent, by equivalents, of a glycidyl ester having the formula $$\overset{O}{\overset{/\backslash}{CH_2-CH}}-CH_2-O-\overset{O}{\overset{\|}{C}}-R^3$$

wherein R$^3$ is a tertiary hydrocarbon group having eight through 10 carbon atoms;

3. about 5–27 percent, by equivalents, of a glycol selected from the group consisting of ethylene glycol, propylene glycol, 1,3-butane diol, 1,4-butane diol, and neopentyl glycol; and 4. about 23–28 percent, by equivalents, of a triol selected from the group consisting of trimethylol ethane, trimethylol propane, glycerine and pentaerythritol.

5. The coating composition of claim 4 in which three–five of the —CH$_2$OH groups of the melamine/formaldehyde resin have been reacted with methanol.

6. The coating composition of claim 5 in which the primer pigment is titanium dioxide and the abrasive pigment is zirconium silicate.

7. The coating composition of claim 2 wherein

I. the graft copolymer has a backbone of styrene and methyl methacrylate and R$^1$ is ethylene, R$^2$ is phenylene and R$^3$ is a tertiary aliphatic hydrocarbon group having eight through 10 carbon atoms;

II. the polyester is the reaction product of maleic anhydride, orthophthalic anhydride, ethylene glycol, trimethylol propane and a glycidyl ester wherein R$^3$ is defined as above;

III. a melamine/formaldehyde resin having three–five of the —CH$_2$OH groups reacted with methanol; and pigments in a pigment to binder ratio of about 150:100 wherein the primer pigment is titanium dioxide and the abrasive pigment is zirconium silicate.

8. A sheet material of a fiberglass reinforced plastic substrate having on at least one side about a 0.1–10 mil dried coalesced finish of the coating composition of claim 1.

9. The sheet material of claim 8 in which the plastic is a glycol phthalate, glycol maleate copolyester cross-linked with styrene.

10. A coating composition consisting essentially of 5–50 percent of a film forming binder in an organic solvent; wherein the binder consists essentially of I. 20–70 percent by weight of the graft copolymer of claim 1;

II. 5–40 percent by weight of the polyester of claim 1; and

III. 15–55 percent of urea/formaldehyde resin.

11. A paper substrate coated with about 0.1–1 mil of the dried coalesced composition of claim 10.

* * * * *